(12) United States Patent
Liu et al.

(10) Patent No.: US 11,890,756 B2
(45) Date of Patent: Feb. 6, 2024

(54) LEGGED ROBOT AND LEG ASSEMBLY THEREOF

(71) Applicant: Beijing Xiaomi Robot Technology Co., Ltd., Beijing (CN)

(72) Inventors: Yiyang Liu, Beijing (CN); Wenping Guo, Beijing (CN); Xiaomao Wei, Beijing (CN); Fang Zhi, Beijing (CN); Shuang Li, Beijing (CN)

(73) Assignee: BEIJING XIAOMI ROBOT TECHNOLOGY CO., LTD., Beijing (CN)

( * ) Notice: Subject to any disclaimer, the term of this patent is extended or adjusted under 35 U.S.C. 154(b) by 43 days.

(21) Appl. No.: 17/514,787

(22) Filed: Oct. 29, 2021

(65) Prior Publication Data

US 2022/0226984 A1 Jul. 21, 2022

(30) Foreign Application Priority Data

Jan. 15, 2021 (CN) .......................... 202120117250.9

(51) Int. Cl.
| | |
|---|---|
| *B25J 9/10* | (2006.01) |
| *B25J 9/16* | (2006.01) |
| *B25J 9/00* | (2006.01) |
| *B25J 9/06* | (2006.01) |
| *B62D 57/032* | (2006.01) |

(52) U.S. Cl.
CPC ............. *B25J 9/101* (2013.01); *B25J 9/0009* (2013.01); *B25J 9/06* (2013.01); *B25J 9/162* (2013.01); *B62D 57/032* (2013.01)

(58) Field of Classification Search
CPC ... B25J 9/10; B25J 9/101; B25J 9/0009; B25J 9/06; B25J 9/162; B62D 57/032
USPC ............................... 74/490.05; 901/1, 15, 21
See application file for complete search history.

(56) References Cited

U.S. PATENT DOCUMENTS

| | | | | |
|---|---|---|---|---|
| 3,759,563 A | * | 9/1973 | Kitamura ................. | B25J 9/041 901/29 |
| 4,648,782 A | * | 3/1987 | Kraft ........................ | B25J 9/046 901/29 |
| 10,189,519 B2 | * | 1/2019 | Hurst .................... | B62D 57/032 |

(Continued)

FOREIGN PATENT DOCUMENTS

| | | | | |
|---|---|---|---|---|
| CN | 1171998 A | * | 2/1998 | ............. B25J 9/101 |
| CN | 1883994 A | * | 12/2006 | |

(Continued)

*Primary Examiner* — T. Scott Fix
(74) *Attorney, Agent, or Firm* — COZEN O'CONNOR

(57) ABSTRACT

A leg assembly and a legged robot having same are provided. The leg assembly includes a first leg, a second leg, a motor, an output flange and a transmission component. The motor is arranged at a first end of the first leg, and an output shaft of the motor is connected to the output flange to drive the output flange to rotate. The first leg is pivotably connected to the second leg, and the transmission component is connected to the output flange and the second leg to drive the second leg to rotate relative to the first leg. The output flange is provided with a first limiting portion, the first leg is provided with a first stop portion and a second stop portion spaced apart and configured to stop the first limiting portion, and the first leg is provided with a second limiting portion configured to stop the second leg.

17 Claims, 7 Drawing Sheets

(56) References Cited

U.S. PATENT DOCUMENTS

| | | | | |
|---|---|---|---|---|
| 2007/0089963 A1* | 4/2007 | Kinoshita | ............... | B25J 9/101 |
| | | | | 29/407.01 |
| 2008/0161829 A1* | 7/2008 | Kang | ...................... | B25J 9/101 |
| | | | | 606/130 |
| 2013/0192406 A1* | 8/2013 | Godowski | ............... | B25J 9/106 |
| | | | | 901/1 |
| 2015/0283709 A1* | 10/2015 | Dalakian | ................ | B25J 9/104 |
| | | | | 74/490.04 |
| 2018/0009104 A1* | 1/2018 | Vance | ................... | B25J 9/1664 |
| 2020/0207432 A1* | 7/2020 | Li | ....................... | B62D 57/032 |
| 2020/0315357 A1* | 10/2020 | Lim | ...................... | A47C 9/025 |

FOREIGN PATENT DOCUMENTS

| | | | | |
|---|---|---|---|---|
| CN | 103318289 A * | 9/2013 | | |
| EP | 1743745 A1 * | 1/2007 | ............. | B25J 9/101 |
| EP | 1777044 A2 * | 4/2007 | ............. | B25J 18/00 |
| EP | 3696060 A1 * | 8/2020 | ............. | B25J 13/08 |
| JP | S6034286 A * | 2/1985 | ............. | B25J 17/00 |
| WO | WO-0228600 A2 * | 4/2002 | ............ | B25J 9/1615 |
| WO | WO-2004087381 A1 * | 10/2004 | ............. | B25J 9/102 |
| WO | WO-2020052591 A1 * | 3/2020 | ............... | A47F 8/02 |

* cited by examiner

US 11,890,756 B2

LEGGED ROBOT AND LEG ASSEMBLY THEREOF

CROSS-REFERENCE TO RELATED APPLICATION

This application is based on and claims priority to the Chinese Patent Application No. 202120117250.9 filed on Jan. 15, 2021, the entire content of which is incorporated herein by reference.

TECHNICAL FIELD

The present disclosure relates to a field of legged robots, and more particularly, to a leg assembly for a legged robot and a legged robot having the same.

BACKGROUND

A legged robot, also known as a robot having legs, generally includes a body assembly and a leg assembly. The leg assembly includes a thigh pivotably connected to the body assembly and a shank pivotably connected to the thigh. In the related art, due to a large rotational inertia of the shank relative to the thigh, each member of the leg assembly is subjected to a large force and a large impact. Moreover, the leg assembly is noisy, the reliability of the shank is low, and the accurate control of the leg assembly is difficult.

SUMMARY

Embodiments of the present disclosure provide a leg assembly for a legged robot.

Embodiments of the present disclosure further provide a legged robot.

The leg assembly for the legged robot according to the embodiments of the present disclosure includes a first leg, a second leg, a motor, an output flange and a transmission component, the motor is arranged at a first end of the first leg, an output shaft of the motor is connected to the output flange to drive the output flange to rotate, the first leg is pivotably connected to the second leg, the transmission component is connected to the output flange and the second leg and configured to drive the second leg to rotate relative to the first leg, the output flange is provided with a first limiting portion, the first leg is provided with a first stop portion and a second stop portion, the first stop portion and the second stop portion are spaced apart and configured to stop the first limiting portion to limit a rotation angle of the output flange, and the first leg is provided with a second limiting portion configured to stop the second leg to limit rotation of the second leg.

The legged robot according to the embodiments of the present disclosure includes a body assembly and a plurality of leg assemblies. Each leg assembly includes a first leg, a second leg, a motor, an output flange and a transmission component, the motor is arranged at a first end of the first leg, an output shaft of the motor is connected to the output flange to drive the output flange to rotate, the first leg is pivotably connected to the second leg, the transmission component is connected to the output flange and the second leg and configured to drive the second leg to rotate relative to the first leg, the output flange is provided with a first limiting portion, the first leg is provided with a first stop portion and a second stop portion, the first stop portion and the second stop portion are spaced apart and configured to stop the first limiting portion to limit a rotation angle of the output flange, and the first leg is provided with a second limiting portion configured to stop the second leg to limit rotation of the second leg. The first leg of the leg assembly is pivotably connected to the body assembly.

DETAILED DESCRIPTION

Embodiments of the present disclosure are described in detail below, and examples of the embodiments are shown in accompanying drawings. The following embodiments described with reference to the accompanying drawings are exemplary and are intended to explain the present disclosure rather than limit the present disclosure.

A leg assembly for a legged robot and a legged robot having the leg assembly according to embodiments of the present disclosure are described below with reference to the accompanying drawings.

Figure 1:
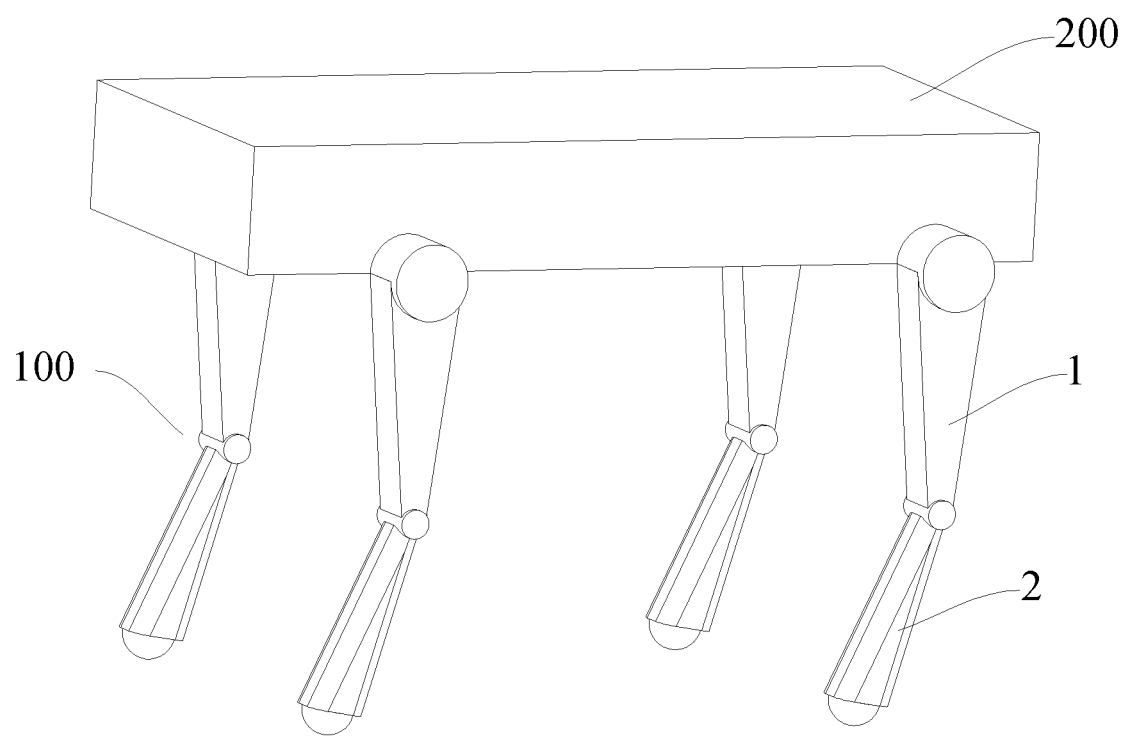
FIG. 1 is a schematic view of a legged robot according to an embodiment of the present disclosure.

First, the legged robot according to the embodiments of the present disclosure is briefly described. As shown in FIG. 1, the legged robot according to the embodiments of the present disclosure includes a body assembly 200 and a plurality of leg assemblies 100. In the embodiment shown in FIG. 1, four leg assemblies 100 are provided, and thus the robot can be called as a quadruped robot or a four-legged robot. It can be understood that the present disclosure is not limited to this. For example, the legged robot can also include two leg assemblies 100. Accordingly, the robot can be called as a biped robot or a two-legged robot. In the embodiment shown in FIG. 1, the four leg assemblies 100 are connected to the body assembly 200 to support the body assembly 200. Actions such as walking of the robot can be realized when the leg assembly 100 operates.

The leg assembly 100 of the legged robot according to the embodiments of the present disclosure is described in detail below.

As shown in FIGS. 1 to 8, the leg assembly for the legged robot according to the embodiments of the present disclosure includes a first leg 1, a second leg 2, a motor 5, an output flange 4 and a transmission component 3. It can be understood that the first leg 1 can also be called as a thigh and the second leg 2 can also be called as a shank. The first leg 1 can be pivotably connected to the body assembly 200 of the robot.

Figure 2:
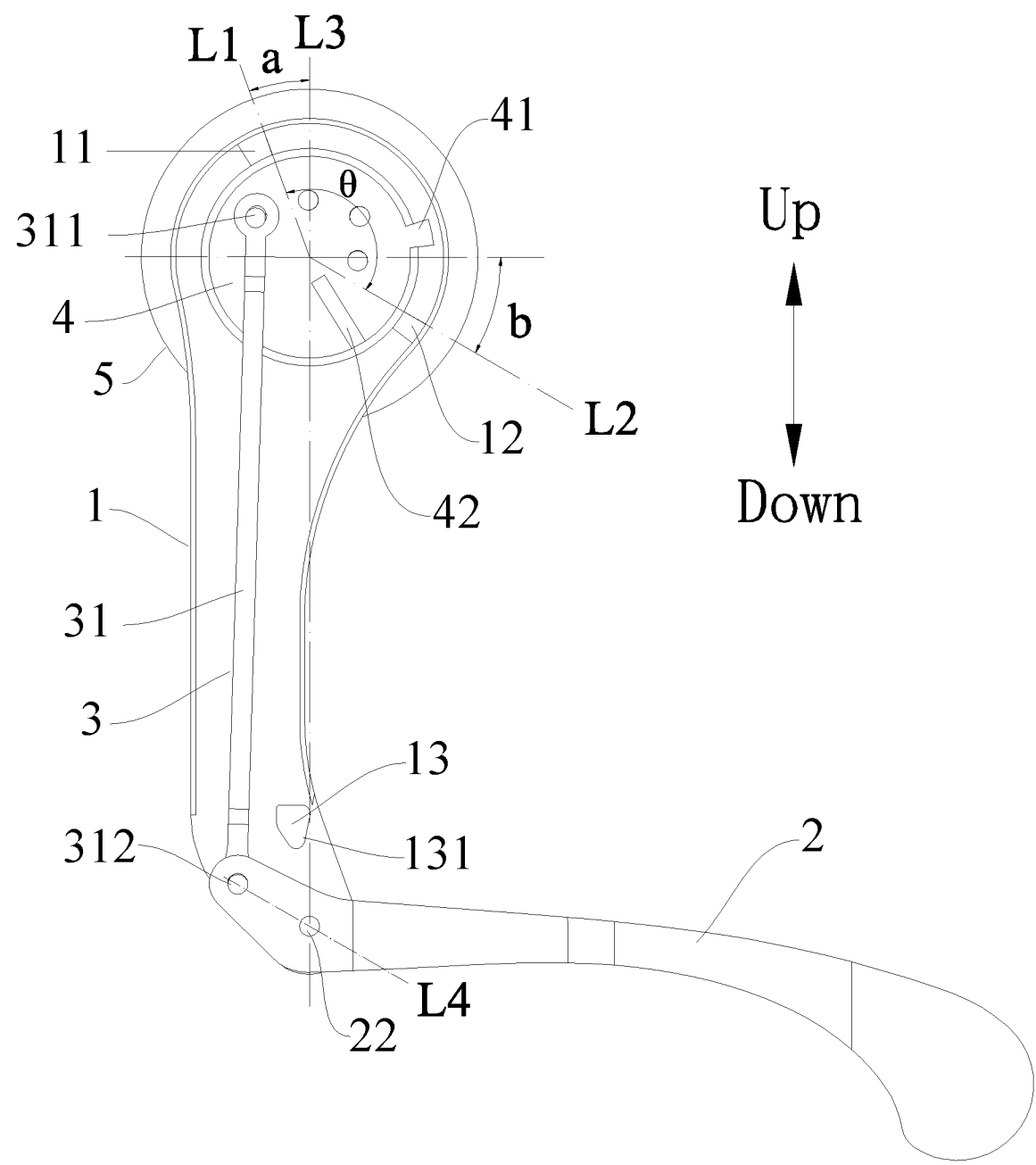
FIG. 2 is a schematic view of a leg assembly for a legged robot according to an embodiment of the present disclosure.
Figure 3:
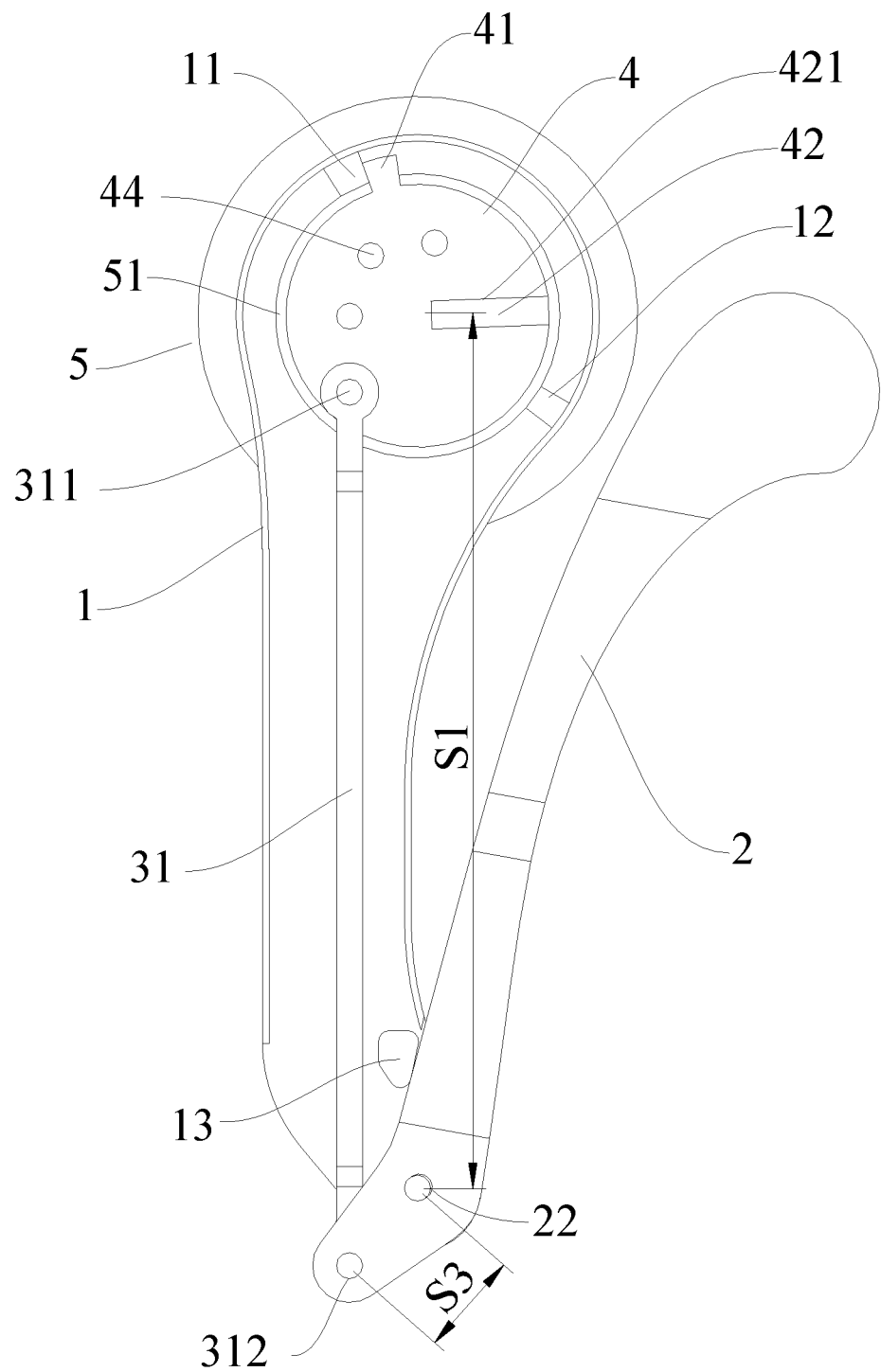
FIG. 3 is a schematic view of a leg assembly for a legged robot according to an embodiment of the present disclosure, in which a second leg is in a retraction limit position.
Figure 4:
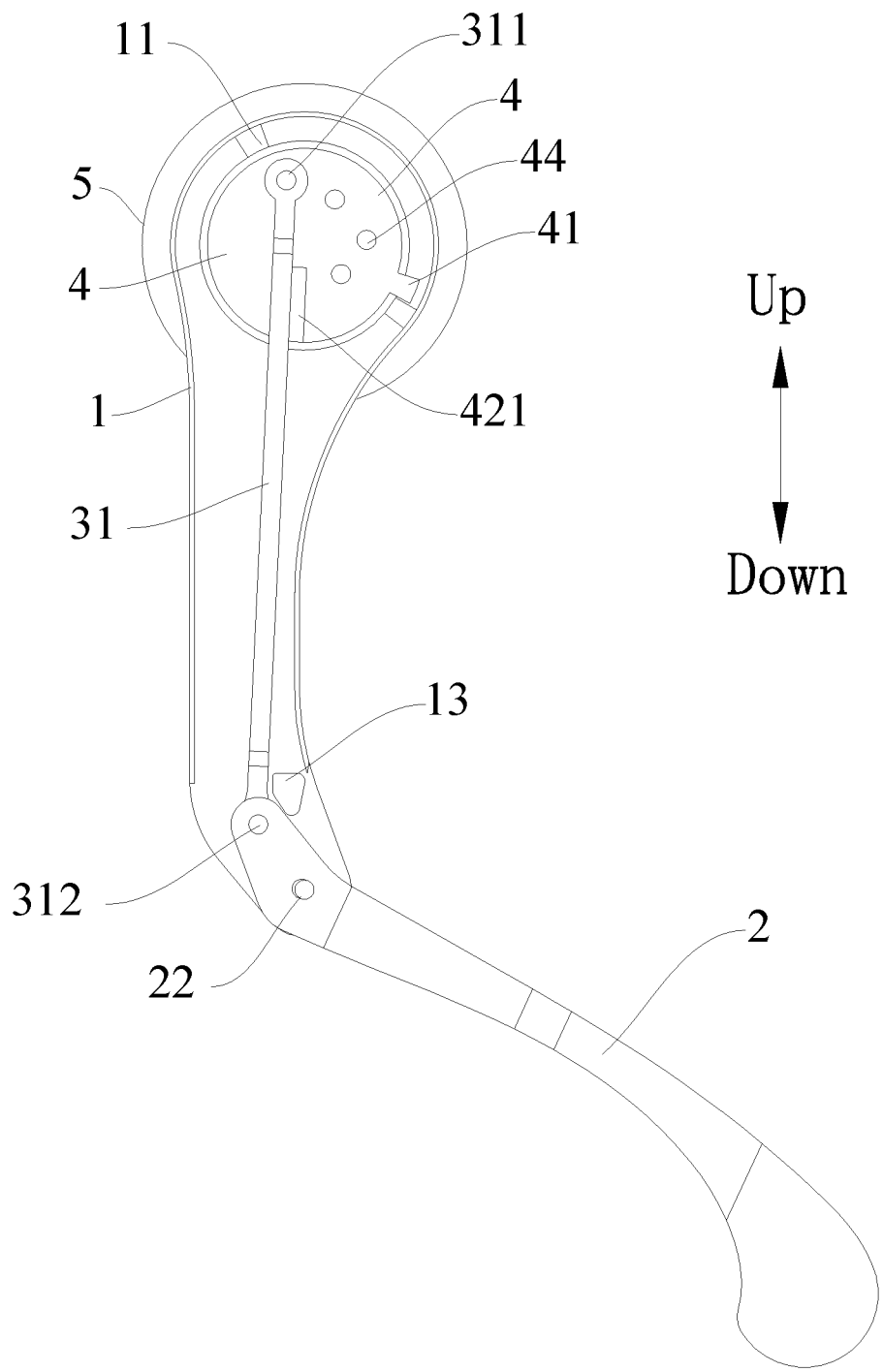
FIG. 4 is a schematic view of a leg assembly for a legged robot according to an embodiment of the present disclosure, in which a second leg is in an extension limit position.

As shown in FIGS. 2 to 4, the motor 5 is arranged at a first end of the first leg 1 (an upper end of the first leg 1 as shown in FIG. 2), an output shaft 51 of the motor 5 is connected to the output flange 4 to drive the output flange 4 to rotate, and the first leg 1 is pivotably connected to the second leg 2. The transmission component 3 is connected to the output flange 4 and the second leg 2 to drive the second leg 2 to rotate relative to the first leg 1.

As shown in FIGS. 2 to 4, the output flange 4 is provided with a first limiting portion 41. The first leg 1 is provided with a first stop portion 11 and a second stop portion 12. The first stop portion 11 and the second stop portion 12 are spaced apart along a circumferential direction of the output flange 4. The first stop portion 11 and the second stop portion 12 can limit a rotation angle of the output flange 4 by stopping the first limiting portion 41, thus limiting a rotation amplitude of the second leg 2 relative to the first leg 1 as well as an extension limit position and a retraction limit position of the second leg 2.

In other words, the first stop portion 11 and the second stop portion 12 define rotation limit positions of the first limiting portion 41 respectively. When the first limiting portion 41 is stopped by the first stop portion 11 or the second stop portion 12, further rotation of the output flange 4 is prevented, that is, further rotation of the motor 5 is prevented.

For example, as shown in FIGS. 2 to 4, when the output flange 4 rotates clockwise from a position shown in FIG. 2, after the first limiting portion 41 contacts the second stop portion 12 on the first leg 1, as shown in FIG. 4, the second stop portion 12 prevents the output flange 4 from further rotating clockwise, that is, the output flange 4 reaches a clockwise rotation limit position, so that the second leg 2 rotates to the extension limit position. Conversely, when the output flange 4 rotates counterclockwise from the position shown in FIG. 2, after the first limiting portion 41 contacts the first stop portion 11 on the first leg 1, as shown in FIG. 3, the first stop portion 11 prevents the output flange 4 from further rotating counterclockwise, that is, the output flange 4 reaches a counterclockwise rotation limit position, so that the second leg 2 rotates to the retraction limit position.

The first leg 1 is provided with a second limiting portion 13, and the second limiting portion 13 is configured to stop the second leg 2 so as to limit rotation of the second leg 2. As shown in FIG. 3, when the second leg 2 moves to the retraction limit position, the second limiting portion 13 stops the second leg 2, and at the same time, the first stop portion 11 stops the first limiting portion 41.

In the leg assembly for the legged robot according to the embodiments of the present disclosure, since the first stop portion 11 and the second stop portion 12 are arranged on the first leg 1, a range of a rotation angle of the output flange 4 can be conveniently limited, so as to facilitate the control of a rotation range of the second leg 2, i.e., the extension limit position and the retraction limit position, thus accurately controlling the operation of the second leg 2. Moreover, since the second limiting portion 13 is arranged on the first leg 1, the second leg moving to the retraction limit position is stopped by the second limiting portion 13 when the first limiting portion 41 is stopped by the first stop portion 11, thus preventing the second leg 2 from hitting the first leg 1. Therefore, the rotation of the output flange can be conveniently limited within a predetermined angle range. Moreover, since the second limiting portion limits the second leg moving to the retracted limit position, the limiting reliability of the leg assembly can be improved, the forces and impacts applied to various members of the leg assembly can be reduced, the noise is decreased, and the accurate control of the leg assembly is facilitated.

As shown in FIGS. 2 to 4, the output flange 4 is a disc and is coaxially connected to the output shaft 51 of the motor 5. The first limiting portion 41 is arranged on an outer circumferential wall of the output flange 4, and the first stop portion 11 and the second stop portion 12 are arranged on the upper end of the first leg 1 along the circumferential direction of the output flange 4.

In the embodiment shown in FIGS. 2 to 4, the first limiting portion 41, the first stop portion 11 and the second stop portion 12 are rectangular blocks, so that the first limiting portion 41 can be in surface contact with the first stop portion 11 and the second stop portion 12. Thus, the force is more uniform and the impact is less. In some embodiments of the present disclosure, surfaces of the first stop portion 11 and the second stop portion 12 and/or the first limiting portion 41 may be coated with buffer layers, such as an elastic rubber layer, thereby further reducing impact forces when the first limiting portion 41 contacts the first stop portion 11 and the second stop portion 12. In some embodiments of the present disclosure, a conical groove can be formed in the surfaces of the first stop portion 11 and the second stop portion 12 in contact with the first limiting portion 41, and a conical protrusion can be arranged on the first limiting portion 41, so that the conical protrusion gradually enters the conical groove when the first limiting portion 41 contacts the first stop portion 11 or the second stop portion 12, so as to further increase the gentleness of the contact and reduce the impact. In some embodiments of the present disclosure, a surface of the conical groove and/or a surface of the conical protrusion can be coated with an elastic material layer, so as to further reduce the impact.

Figure 8:
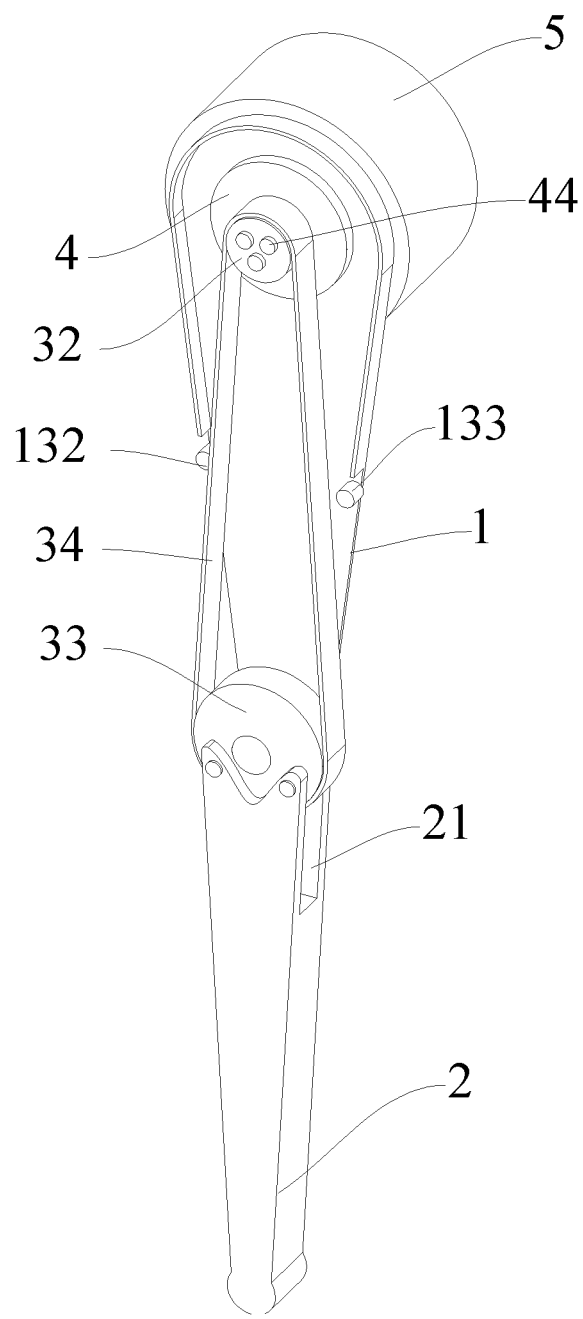
FIG. 8 is a schematic view of a leg assembly for a legged robot according to still another embodiment of the present disclosure.

In some embodiments, as shown in FIGS. 2 to 5, the second limiting portion 13 is a limit block suitable to be in surface contact with the second leg 2. In some other embodiments, the second limiting portion 13 may also be a limit column suitable to be in line contact with the second leg 2, as shown in FIG. 8.

In the embodiments of the present disclosure, the second limiting portion 13 is the limit block suitable to be in surface contact with the second leg 2, so as to further reduce the force and impact applied to the leg assembly 100 and improve the service life of the leg assembly 100.

Specifically, as shown in FIG. 3, the second limiting portion 13 can limit counterclockwise rotation of the second leg 2, and then limit a height of the leg assembly 100 when the legged robot is upright. Thus, the applicability of the leg assembly 100 is improved and the design of the robot is facilitated.

In some embodiments, as shown in FIGS. 2 to 5, the output flange 4 is provided with a third limiting portion 42, and the third limiting portion 42 is configured to stop the transmission component 3 to limit the rotation of the second leg 2. In other words, as shown in FIG. 4, when the second leg 2 moves to the extension limit position, the first limiting portion 41 contacts the first stop portion 11 and the third limiting portion 42 contacts the transmission component 3, so as to have a dual limit on the second leg 2 moving to the extension limit position, thus improving the limiting reliability.

In some embodiments of the present disclosure, as shown in FIG. 3 and FIG. 4, the third limiting portion 42 is a bump 421 arranged on a surface of the output flange 4. As shown in FIG. 4, when the output flange 4 rotates clockwise and when the second leg 2 rotates clockwise to the extension limit position, the transmission component 3 contacts the third limiting portion 42 to stop the movement of the transmission component 3, so as to limit the rotation of the output flange 4, the motor 5 and the second leg 2. The bump 421 rotates clockwise along with the output flange 4 and stops the transmission component 3, so as to further limit the movement of the second leg 2, thus further improving the limiting reliability of the leg assembly 100.

In some embodiments, the transmission component 3 includes a connecting rod 31. A first end of the connecting rod 31 (an upper end of the connecting rod 31 as shown in FIG. 4) is pivotably connected to the output flange 4 through a first pivot shaft 311, a second end of the connecting rod 31 (a lower end of the connecting rod 31 as shown in FIG. 4) is pivotably connected to a first end of the second leg 2 (an upper end of the second leg 2 as shown in FIG. 4) through a second pivot shaft 312, and a second end of the first leg 1 (a lower end of the first leg 1 as shown in FIG. 4) is pivotably connected to the first end of the second leg 2 (the upper end of the second leg 2 as shown in FIG. 4) through a third pivot shaft 22.

After the motor 5 is started, the motor 5 drives the output flange 4 to rotate for (example, to swing) around a central axis of the output shaft 51 through the output shaft 51. Since the first pivot shaft 311 is eccentrically arranged relative to the central axis of the output shaft 51, the first pivot shaft 311 revolves around the central axis of the output shaft 51, and then drives the first end of the connecting rod 31 to revolve around the central axis of the output shaft, thus driving the connecting rod 31 to move. Since the second end of the connecting rod 31 is pivotably connected to the first end of the second leg 2 through the second pivot shaft 312, and also the first end of the second leg 2 is pivotably connected to the second end of the first leg 1 through the third pivot shaft 22, the connecting rod 31 drives the second leg 2 to rotate around the third pivot shaft 22 relative to the first leg 1.

More specifically, in FIG. 2, the second pivot shaft 312 is located between the third pivot shaft 22 and an end face of the first end (a left end in FIG. 2) of the second leg 2, that is, the second pivot shaft 312 is closer to the end face of the first end of the second leg 2 than the third pivot shaft 22. When the output flange 4 rotates clockwise, the connecting rod 31 moves upward and drives the second pivot shaft 312 to move upward, so as to drive the second leg 2 to swing clockwise around the third pivot shaft 22, that is, the second leg 2 extends relative to the first leg 1. On the contrary, when the output flange 4 rotates counterclockwise, the connecting rod 31 moves downward and drives the second pivot shaft 312 to move downward, so as to drive the second leg 2 to swing counterclockwise around the third pivot shaft 22, that is, the second leg 2 retracts relative to the first leg 1.

In some other embodiments of the present disclosure, the third pivot shaft 22 may also be located between the second pivot shaft 312 and the end face of the first end of the second leg 2, that is, the third pivot shaft 22 is closer to the end face of the first end of the second leg 2 than the second pivot shaft 312. Thus, when the output flange 4 rotates clockwise, the second leg 2 is driven to retract relative to the first leg 1, and when the output flange 4 rotates counterclockwise, the second leg 2 is driven to extend relative to the first leg 1.

Figure 7:
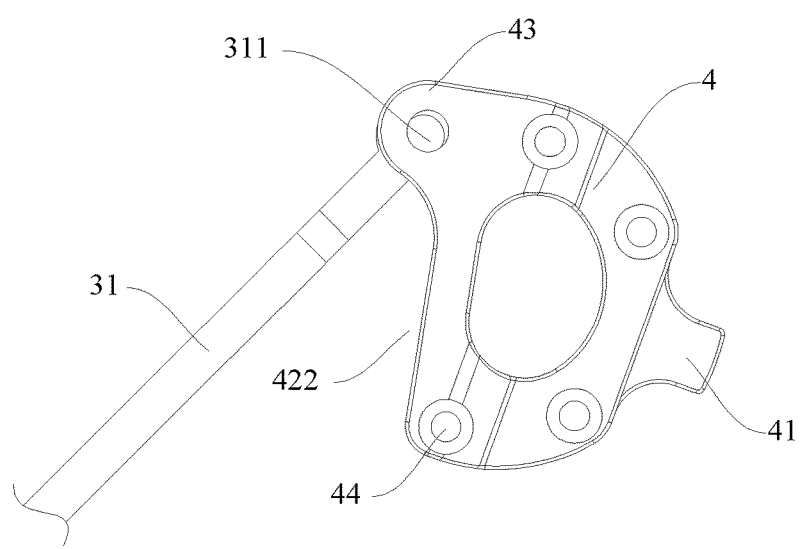
FIG. 7 is a schematic view of an output flange and a connecting rod connected with each other of a leg assembly for a legged robot according to another embodiment of the present disclosure.

In some embodiments, as shown in FIG. 7, the output flange 4 has a recessed portion 422, an end of the recessed portion 422 is provided with a U-shaped fitting groove 43, the first end of the connecting rod 31 is pivotably fitted in the U-shaped fitting groove 43, and a bottom surface of the recessed portion 422 is configured as the third limiting portion 42. It can be understood that, as shown in FIG. 7, when the connecting rod 31 rotates, a side wall of the connecting rod 31 can abut against the bottom surface of the recessed portion 422, to limit the rotation of the connecting rod 31, and then to limit the rotation of the output flange 4, the motor 5 and the second leg 2, Thus, the limiting reliability is further improved, the forces and impacts applied to various members are reduced, and the movement of the second leg 2 can be accurately controlled.

Figure 5:
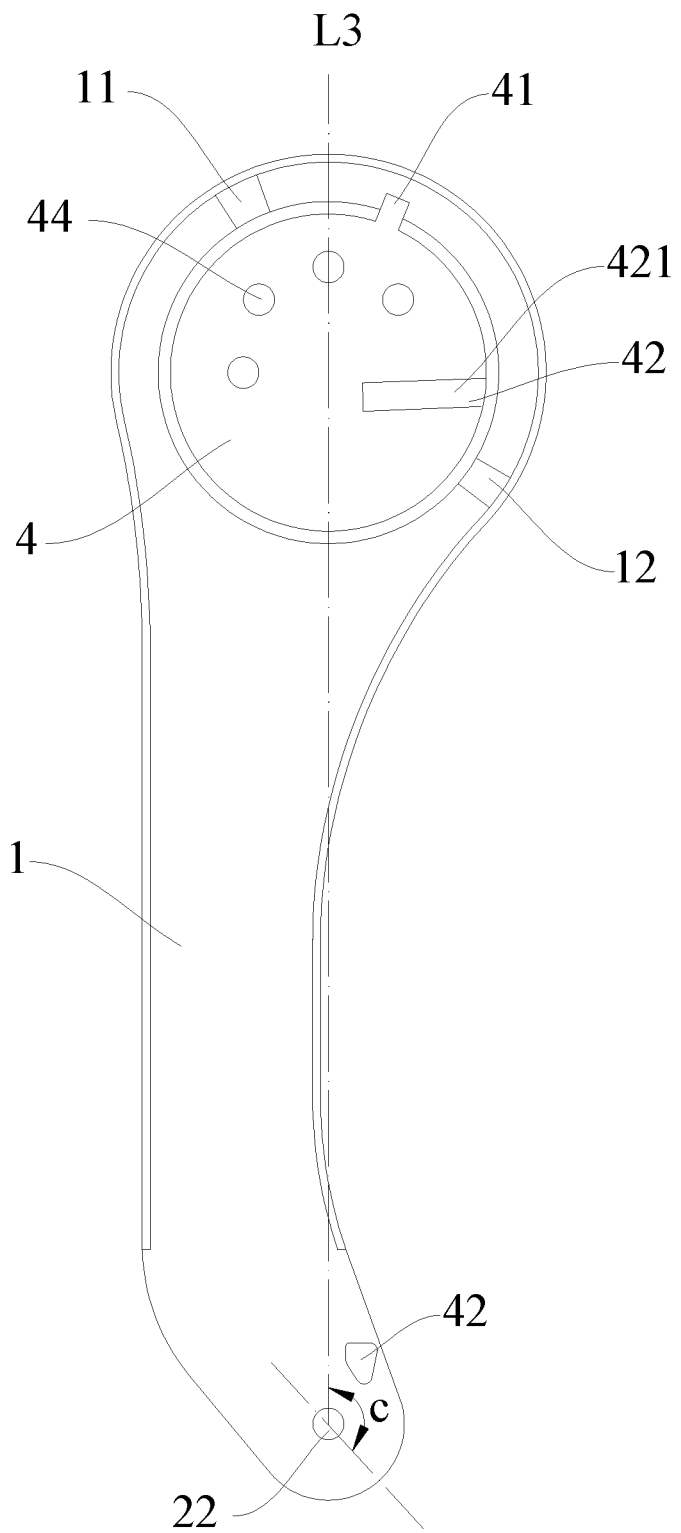
FIG. 5 is a schematic view of a first leg and an output flange of a leg assembly for a legged robot according to an embodiment of the present disclosure.
Figure 6:
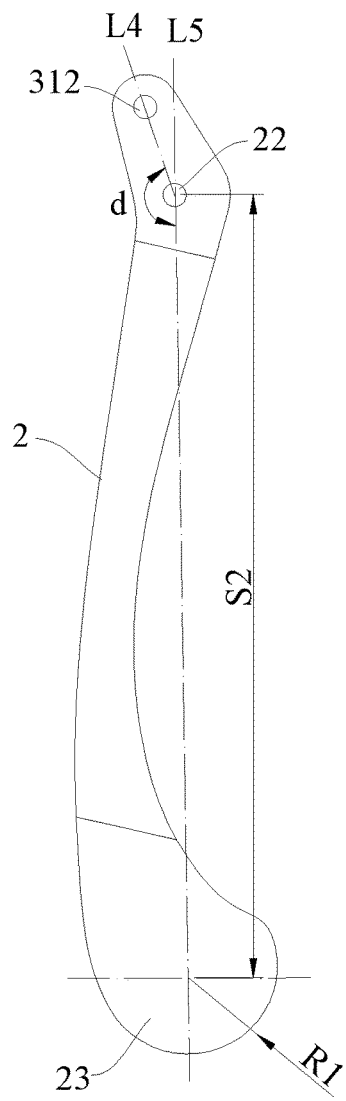
FIG. 6 is a schematic view of a second leg of a leg assembly for a legged robot according to an embodiment of the present disclosure.

Further, as shown in FIG. 2, FIG. 5 and FIG. 6, a first connecting line between the first stop portion 11 and a center of the output shaft 51 is L1, a second connecting line between the second stop portion 12 and the center of the output shaft 51 is L2, and an included angle between the first connecting line L1 and the second connecting line L2 is θ, in which 110 degrees≤θ≤160 degrees. In other words, the first connecting line L1 is a connecting line between a center of the output flange 4 and a contact surface of the first stop portion 11 configured to be in contact with the first limiting portion 41, and the second connecting line L2 is a connecting line between the center of the output flange 4 and a contact surface of the second stop portion 12 configured to be in contact with the first limiting portion 41. Through research, the inventor of the present disclosure found that since a swing angle of the first limiting portion 41 is set between 110 degrees and 160 degrees, the force and impact applied to the leg assembly can be further reduced, and the rotation of the second leg 2 is more stable.

Specifically, as shown in FIG. 2, FIG. 5 and FIG. 6, and more specifically, as shown in FIG. 3 and FIG. 4, an included angle a between the first connecting line L1 and a third connecting line L3 between a center of the third pivot shaft 22 and the center of the output shaft 51 satisfies a relation: 0≤α≤40 degrees. An included angle b between the second connecting line L2 and a direction perpendicular to the third connecting line L3 satisfies a relation: 10 degrees≤b≤50 degrees.

As shown in FIG. 3 and FIG. 4, a sum of the included angle a between the first connecting line L1 and the third connecting line L3 between the center of the third pivot shaft 22 and the center of the output shaft 51 and the included angle b between the second connecting line L2 and the direction perpendicular to the third connecting line L3 plus 90 degrees is the included angle θ between the first connecting line L1 and the second connecting line L2. Through research, the inventor of the present disclosure has found that since the included angle a and the included angle b are limited within the above ranges, the forces and impacts applied to various members can be further reduced, the operation is more stable, and the control of the operation of the second leg 2 can be more accurate.

In some embodiments, as shown in FIG. 2, FIG. 5 and FIG. 6, an included angle c between a length direction of the second end of the first leg 1 and the third connecting line L3 satisfies a relation: 130 degrees≤c≤170 degrees. Further, an included angle d between a fourth connecting line L4 between a center of the second pivot shaft 312 and the center of the third pivot shaft 22 and a fifth connecting line L5 between the center of the third pivot shaft 22 and a center of the second end (a lower end of the second leg 2 as shown in FIG. 6) of the second leg 2 satisfies a relation: 140 degrees≤d≤180 degrees.

Through research, the inventor of the present disclosure found that, since the included angle c of the first leg 1 and/or the included angle d of the second leg 2 are set as described above, the first leg and the second leg have a wide movement range, thus allowing the full use of their degrees of freedom and avoiding interference. Therefore, the movement stability of the first leg 1, the second leg 2 and the connecting rod 31 is good.

Further, as shown in FIGS. 2-4, a distance between a center of the first pivot shaft 311 and the center of the output shaft 51 is less than a distance between the center of the second pivot shaft 312 and the center of the third pivot shaft 22. Through this design, a swing track of the second leg 2 can be controlled more conveniently, the motion performance of the second leg can be improved, and the motion characteristics of the leg assembly and the robot can be controlled more accurately.

In some embodiments, as shown in FIG. 3 and FIG. 6, a distance S1 between the center of the output shaft 51 and the center of the third pivot shaft 22 is 0.6 to 1 times a distance S2 between the center of the third pivot shaft 22 and the center of the second end of the second leg 2.

For example, the distance S1 between the center of the output shaft 51 and the center of the third pivot shaft 22 is 0.6 times the distance S2 between the center of the third pivot shaft 22 and the center of the second end of the second leg 2. Or, the distance S1 between the center of the output shaft 51 and the center of the third pivot shaft 22 is 1 time the distance S2 between the center of the third pivot shaft 22 and the center of the second end of the second leg 2. Through simulations, the inventor of the present disclosure found that when a ratio between the second leg 2 and the first leg 1 is 0.6 or 1, the leg assembly 100 can move more smoothly and stably, and consume less energy.

In some embodiments of the present disclosure, the distance S1 between the center of the output shaft 51 and the center of the third pivot shaft 22 is 0.84 times the distance S2 between the center of the third pivot shaft 22 and the center of the second end of the second leg 2. Through simulations, the inventor of the present disclosure found that when the ratio between the second leg 2 and the first leg 1 is 0.84, the leg assembly 100 can move even more smoothly and stably, and the energy consumed by the leg assembly 100 is further reduced.

In some embodiments, as shown in FIG. 3 and FIG. 6, the distance S2 between the center of the third pivot shaft 22 and the center of the second end of the second leg 2 is 6 to 10 times a distance S3 between the center of the second pivot shaft 312 and the center of the third pivot shaft 22.

For example, the distance S2 between the center of the third pivot shaft 22 and the center of the second end of the second leg 2 is 6 times the distance S3 between the center of the second pivot shaft 312 and the center of the third pivot shaft 22. Or, the distance S2 between the center of the third pivot shaft 22 and the center of the second end of the second leg 2 is 10 times the distance S3 between the center of the second pivot shaft 312 and the center of the third pivot shaft 22. Through experiments, the inventor of the present disclosure found that when a ratio of S2 to S3 is 6 or 10, the force and impact applied to the leg assembly 100 can be further reduced, and the rotation of the second leg 2 is more stable.

In some embodiments of the present disclosure, the distance S2 between the center of the third pivot shaft 22 and the center of the second end of the second leg 2 is 8.3 times the distance S3 between the center of the second pivot shaft 312 and the center of the third pivot shaft 22. Through experiments, the inventor of the present disclosure found that when the ratio of S2 to S3 is 8.3, the force and impact applied to the leg assembly 100 are the smallest, and the rotation of the second leg 2 is even more stable.

In some embodiments, as shown in FIG. 3 and FIG. 6, the second end of the second leg 2 has a ground contact portion 23, and an outer circumferential surface of the ground contact portion 23 is a hemispherical surface. The distance S2 between the center of the third pivot shaft 22 and the center of the second end of the second leg 2 is 7 to 11 times a radius R1 of the outer circumferential surface of the ground contact portion 23.

For example, the distance S2 between the center of the third pivot shaft 22 and the center of the second end of the second leg 2 is 7 times the radius R1 of the outer circumferential surface of the ground contact portion 23. Or, the distance S2 between the center of the third pivot shaft 22 and the center of the second end of the second leg 2 is 11 times the radius R1 of the outer circumferential surface of the ground contact portion 23. Through experiments, the inventor of the present disclosure found that when a ratio of S2 to R1 is 7 or 11, the strength of the second leg 2 is good, and the uniformity of the force applied to the second leg 2 can be improved.

In some embodiments of the present disclosure, the distance S2 between the center of the third pivot shaft 22 and the center of the second end of the second leg 2 is 9 times the radius R1 of the outer circumferential surface of the ground contact portion 23. Through experiments, the inventor of the present disclosure found that when the ratio of S2 to R1 is 9, the strength of the second leg 2 is better, and the uniformity of the force applied to the second leg 2 can be further improved.

In some embodiments, as shown in FIG. 8, the transmission component 3 includes a first wheel 32, a second wheel 33 and a flexible transmission member 34 wound around the first wheel 32 and the second wheel 33. The first wheel 32 is mounted on the output flange 4, the second wheel 33 is rotatably mounted on the second end of the first leg 1, and the first end of the second leg 2 is connected to the second wheel 33.

In some embodiments of the present disclosure, as shown in FIG. 8, the first wheel 32 and the second wheel 33 are pulleys and the flexible transmission member 34 is a conveyor belt, or the first wheel 32 and the second wheel 33 are sprockets and the flexible transmission member 34 is a chain. It can be understood that the motor 5 can drive the first wheel 32 to rotate, the first wheel 32 drives the second wheel 33 to rotate through the flexible transmission member 34, and the second wheel 33 can drive the second leg 2 to rotate.

Further, as shown in FIG. 8, the second limiting portion 13 includes a second left limiting portion 132 and a second right limiting portion 133 spaced apart along a width direction of the first leg 1 (such as a left-right direction of the first leg 1 in FIG. 8), and the second left limiting portion 132 and the second right limiting portion 133 are configured to limit a rotation angle of the second leg 2. Specifically, the flexible transmission member 34 is located between the second left limiting portion 132 and the second right limiting portion 133, and the second left limiting portion 132 and the second right limiting portion 133 are symmetrically arranged along a direction perpendicular (i.e. the left-right direction of the first leg 1) to a length direction of the first leg 1.

Specifically, as shown in FIG. 8, the first end of the second leg 2 is provided with a U-shaped groove 21, and a part of the second wheel 33 is located in the U-shaped groove 21. It can be understood that the second wheel 33 is erected on the upper end of the second leg 2, and the upper end of the second leg 2 is connected to the second wheel 33 through a bolt or a rivet, so that the second wheel 33 can drive the second leg 2 to rotate.

As shown in FIGS. 2 to 4 and FIG. 8, the output flange 4 is connected to the output shaft 51 through a plurality of pin shafts 44. For example, three pin shafts 44 are provided, and the output flange 4 is fixed with the output shaft 51 through the three pin shafts 44, thus improving the connection strength between the output flange 4 and the output shaft 51.

As shown in FIG. 1, the legged robot according to the embodiments of the present disclosure has four leg assemblies 100, and the four leg assemblies 100 are connected to the body assembly 200. It can be understood that the first leg 1 of the leg assembly 100 can be driven by an additional motor to rotate relative to the body assembly 200, and the motor 5 drives the second leg 2 to rotate relative to the first leg 1, so as to realize actions such as walking of the robot. In the legged robot according to the embodiments of the present disclosure, the limiting of the leg assembly is reliable, the forces and impacts applied to various members are small, the noise is small, the operation is stable, and the control precision is high.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features defined with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "interconnected," "connected," "fixed" and the like are used broadly, and may be, for example, fixed connections, detachable connections, or integral connections; may also be mechanical or electrical connections or intercommunication; may also be direct connections or indirect connections via intervening structures; may also be inner communications or interactions of two elements, which can be understood by those skilled in the art according to specific situations.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation on the present disclosure, and changes, modifications, alternatives and variations can be made in the above embodiments by those skilled in the art within the scope of the present disclosure.

What is claimed is:

1. A leg assembly for a legged robot, comprising:
   a first leg having a first end and a second end;
   a motor arranged at the first end of the first leg, and having an output shaft;
   an output flange connected to the output shaft of the motor, and configured to be driven by the output shaft of the motor to rotate;
   a second leg pivotably connected to the second end of the first leg; and
   a transmission component connected to the output flange and the second leg, and configured to drive the second leg to rotate relative to the first leg,
   wherein the output flange is provided with a first limiting portion, the first leg is provided with a first stop portion and a second stop portion, the first stop portion and the second stop portion are spaced apart and configured to stop the first limiting portion to limit a rotation angle of the output flange, and the first leg is provided with a second limiting portion configured to stop the second leg to limit rotation of the second leg,
   wherein the output flange is provided with a third limiting portion configured to stop the transmission component to limit the rotation of the second leg,
   wherein the transmission component comprises a connecting rod, a first end of the connecting rod is pivotably connected to the output flange through a first pivot shaft, a second end of the connecting rod is pivotably connected to a first end of the second leg through a second pivot shaft, and the second end of the first leg is pivotably connected to the first end of the second leg through a third pivot shaft,
   wherein the output flange has a recessed portion, an end of the recessed portion is provided with a U-shaped fitting groove, the first end of the connecting rod is pivotably fitted in the U-shaped fitting groove, and a bottom surface of the recessed portion is configured as the third limiting portion.

2. The leg assembly according to claim 1, wherein the second limiting portion is configured as one of a limit column configured to be in line contact with the second leg and a limit block configured to be in surface contact with the second leg.

3. The leg assembly according to claim 1, wherein the third limiting portion is a bump arranged on a surface of the output flange.

4. The leg assembly according to claim 1, wherein an included angle between a first connecting line between the first stop portion and a center of the output shaft and a second connecting line between the second stop portion and the center of the output shaft is denoted as θ and satisfies a relation: 110 degrees≤θ≤160 degrees.

5. The leg assembly according to claim 4, wherein an included angle between the first connecting line and a third connecting line between a center of the third pivot shaft and the center of the output shaft is denoted as a and satisfies a relation: 0≤a≤40 degrees, and an included angle between the second connecting line and a direction perpendicular to the third connecting line is denoted as b and satisfies a relation: 10 degrees≤b≤50 degrees.

6. The leg assembly according to claim 5, wherein an included angle between the second end of the first leg and the third connecting line is denoted as c and satisfies a relation: 130 degrees≤c≤170 degrees.

7. The leg assembly according to claim 1, wherein an included angle between a fourth connecting line between a center of the second pivot shaft and a center of the third pivot shaft and a fifth connecting line between the center of the third pivot shaft and a center of a second end of the second leg is denoted as d and satisfies a relation: 140 degrees≤d≤180 degrees.

8. The leg assembly according to claim 1, wherein a distance between a center of the first pivot shaft and a center of the output shaft is less than a distance between a center of the second pivot shaft and a center of the third pivot shaft.

9. The leg assembly according to claim 1, wherein a distance between a center of the output shaft and a center of the third pivot shaft is 0.6 to 1 times a distance between the center of the third pivot shaft and a center of a second end of the second leg.

10. The leg assembly according to claim 1, wherein a distance between a center of the third pivot shaft and a center of a second end of the second leg is 6 to 10 times a distance between a center of the second pivot shaft and the center of the third pivot shaft.

11. The leg assembly according to claim 1, wherein a second end of the second leg has a ground contact portion, and an outer circumferential surface of the ground contact portion is a hemispherical surface.

12. The leg assembly according to claim 11, wherein a distance between a center of the third pivot shaft and a center of the second end of the second leg is 7 to 11 times a radius of the outer circumferential surface of the ground contact portion.

13. The leg assembly according to claim 1, wherein the output flange is connected to the output shaft through a plurality of pin shafts.

14. A legged robot, comprising:
a body assembly; and
a plurality of leg assemblies, each leg assembly comprising:
  a first leg having a first end and a second end;
  a motor arranged at the first end of the first leg, and having an output shaft;
  an output flange connected to the output shaft of the motor, and configured to be driven by the output shaft of the motor to rotate;
  a second leg pivotably connected to the second end of the first leg; and
  a transmission component connected to the output flange and the second leg, and configured to drive the second leg to rotate relative to the first leg,
  wherein the output flange is provided with a first limiting portion, the first leg is provided with a first stop portion and a second stop portion, the first stop portion and the second stop portion are spaced apart and configured to stop the first limiting portion to limit a rotation angle of the output flange, and the first leg is provided with a second limiting portion configured to stop the second leg to limit rotation of the second leg,
wherein the first leg of the leg assembly is pivotably connected to the body assembly,
wherein the output flange is provided with a third limiting portion configured to stop the transmission component to limit the rotation of the second leg,
wherein the transmission component comprises a connecting rod, a first end of the connecting rod is pivotably connected to the output flange through a first pivot shaft, a second end of the connecting rod is pivotably connected to a first end of the second leg through a second pivot shaft, and the second end of the first leg is pivotably connected to the first end of the second leg through a third pivot shaft,
wherein the output flange has a recessed portion, an end of the recessed portion is provided with a U-shaped fitting groove, the first end of the connecting rod is pivotably fitted in the U-shaped fitting groove, and a bottom surface of the recessed portion is configured as the third limiting portion.

15. A leg assembly for a legged robot, comprising:
a first leg having a first end and a second end;
a motor arranged at the first end of the first leg, and having an output shaft;
an output flange connected to the output shaft of the motor, and configured to be driven by the output shaft of the motor to rotate;
a second leg pivotably connected to the second end of the first leg; and
a transmission component connected to the output flange and the second leg, and configured to drive the second leg to rotate relative to the first leg,
wherein the output flange is provided with a first limiting portion, the first leg is provided with a first stop portion and a second stop portion, the first stop portion and the second stop portion are spaced apart and configured to stop the first limiting portion to limit a rotation angle of the output flange, and the first leg is provided with a second limiting portion configured to stop the second leg to limit rotation of the second leg,
wherein the transmission component comprises a first wheel, a second wheel and a flexible transmission member wound around the first wheel and the second wheel, the first wheel is mounted on the output flange, the second wheel is rotatably mounted on the second end of the first leg, and a first end of the second leg is connected to the second wheel.

16. The leg assembly according to claim 15, wherein the second limiting portion comprises a second left limiting portion and a second right limiting portion spaced apart along a width direction of the first leg.

17. The leg assembly according to claim 15, wherein the first end of the second leg is provided with a U-shaped groove, and a part of the second wheel is located in the U-shaped groove.

\* \* \* \* \*